US009981183B2

(12) United States Patent
Grant et al.

(10) Patent No.: US 9,981,183 B2
(45) Date of Patent: May 29, 2018

(54) HAPTIC PERIPHERAL HAVING A HAPTICALLY-ENHANCED USER INPUT ELEMENT INCLUDING A MECHANICAL KEY AND AN INTEGRATED SMART MATERIAL ACTUATOR FOR PROVIDING HAPTIC EFFECTS

(71) Applicant: Immersion Corporation, San Jose, CA (US)

(72) Inventors: Danny A. Grant, Laval (CA); William Rihn, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days. days.

(21) Appl. No.: 15/159,258

(22) Filed: May 19, 2016

(65) Prior Publication Data

US 2017/0333788 A1    Nov. 23, 2017

(51) Int. Cl.

| | |
|---|---|
| *G06F 17/00* | (2006.01) |
| *A63F 13/285* | (2014.01) |
| *A63F 13/24* | (2014.01) |
| *G06F 3/01* | (2006.01) |
| *G06F 3/02* | (2006.01) |
| *H01H 13/85* | (2006.01) |
| *A63F 13/20* | (2014.01) |

(52) U.S. Cl.
CPC ............ *A63F 13/285* (2014.09); *A63F 13/20* (2014.09); *A63F 13/24* (2014.09); *G06F 3/016* (2013.01); *G06F 3/0202* (2013.01); *H01H 13/85* (2013.01)

(58) Field of Classification Search
None
See application file for complete search history.

(56) References Cited

U.S. PATENT DOCUMENTS

| 4,054,944 A | 10/1977 | Lau |
| 6,211,861 B1 | 4/2001 | Rosenberg et al. |

(Continued)

OTHER PUBLICATIONS

Partial European Search Report issued in EP 17171867.9, dated Sep. 25, 2017.

(Continued)

*Primary Examiner* — Ronald Laneau
(74) *Attorney, Agent, or Firm* — Medler Ferro Woodhouse Mills PLLC

(57) ABSTRACT

A haptic peripheral includes a housing and a haptically-enhanced user input element. The haptically-enhanced user input element is configured to receive an input from a user, and includes a mechanical key having a keycap with a user contact surface configured to contact the user and a smart material actuator integrated onto the user contact surface of the keycap. The smart material actuator is configured to receive a control signal from a processor and is configured to deform at least a portion of the user contact surface relative to the keycap of the mechanical key in response to the control signal from the processor to thereby provide a haptic effect to a user of the haptic peripheral. The haptic peripheral may also include a braking actuator coupled to the mechanical key to hold the mechanical key in a depressed position to indicate an inactive status to a user. In addition, the haptic peripheral and the haptically-enhanced user input element may be modular.

20 Claims, 13 Drawing Sheets

(56) References Cited

U.S. PATENT DOCUMENTS

| | | | |
|---|---|---|---|
| 6,218,966 B1 | 4/2001 | Goodwin et al. | |
| 6,693,626 B1 | 2/2004 | Rosenberg | |
| 7,106,305 B2 | 9/2006 | Rosenberg | |
| 7,382,357 B2 | 6/2008 | Panotopoulos et al. | |
| 7,688,310 B2 | 3/2010 | Rosenberg | |
| 8,310,349 B2 | 11/2012 | Pfau et al. | |
| 8,743,057 B2 | 6/2014 | Rosenberg | |
| 8,760,413 B2 | 6/2014 | Peterson et al. | |
| 8,927,890 B2* | 1/2015 | Peterson | H03K 17/962 200/600 |
| 9,152,264 B2 | 10/2015 | Parker et al. | |
| 9,343,248 B2* | 5/2016 | Casparian | |
| 9,368,300 B2* | 6/2016 | Casparian | |
| 2004/0183783 A1 | 9/2004 | Rojas et al. | |
| 2004/0218963 A1 | 11/2004 | Van Diepen et al. | |
| 2005/0237306 A1 | 10/2005 | Klein et al. | |
| 2008/0068334 A1 | 3/2008 | Olien et al. | |
| 2008/0092087 A1 | 4/2008 | Brown et al. | |
| 2011/0102326 A1 | 5/2011 | Casparian et al. | |
| 2011/0216027 A1* | 9/2011 | Kim | G08B 6/00 345/173 |
| 2014/0091857 A1 | 4/2014 | Bernstein | |
| 2015/0061901 A1* | 3/2015 | Casparian | H01H 13/705 341/22 |
| 2015/0061902 A1* | 3/2015 | Casparian | H03K 17/965 341/22 |
| 2016/0042897 A1 | 2/2016 | Qian | |

OTHER PUBLICATIONS

Extended European Search Report issued in EP 17171867.9, dated Dec. 22, 2017.

* cited by examiner

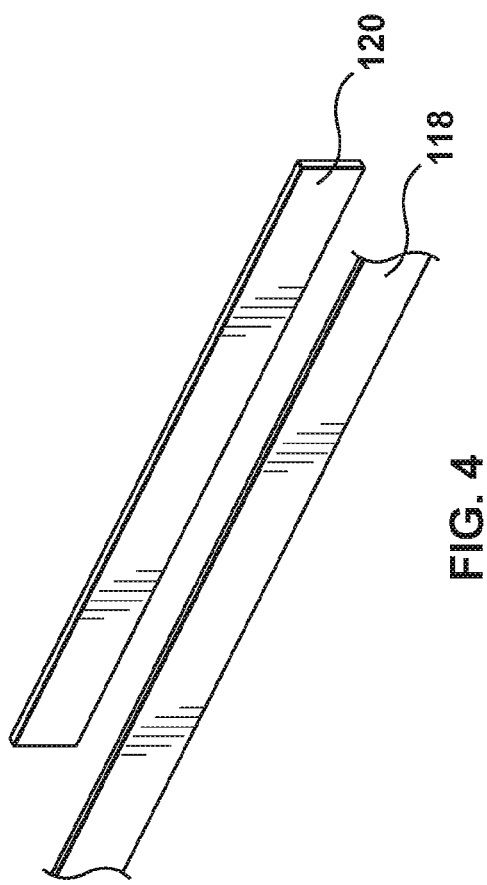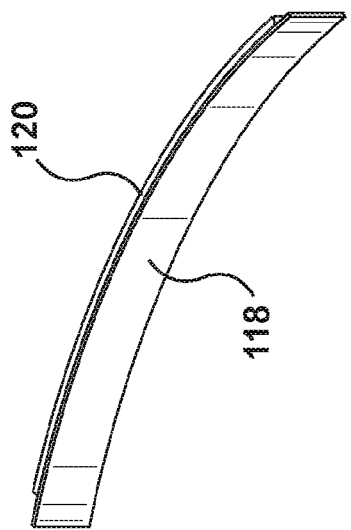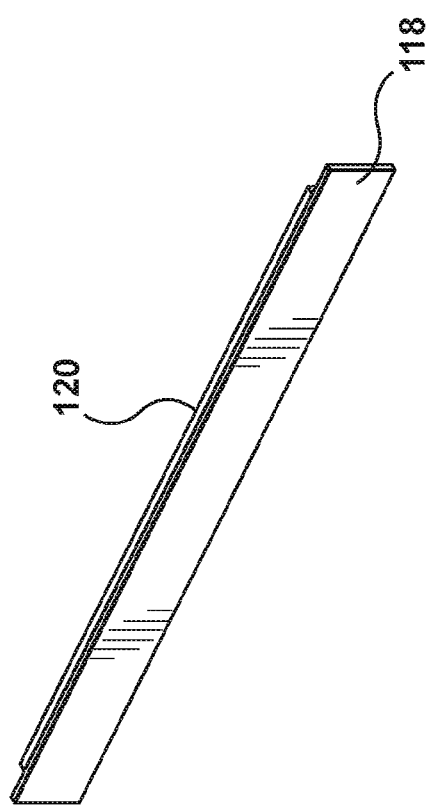

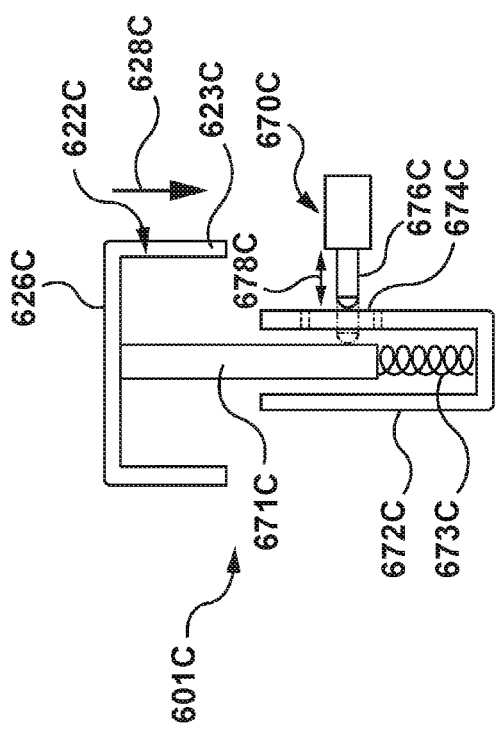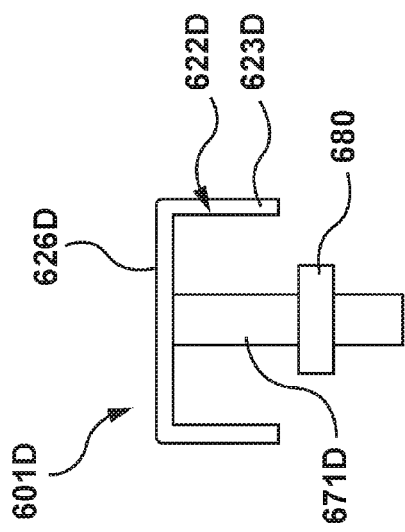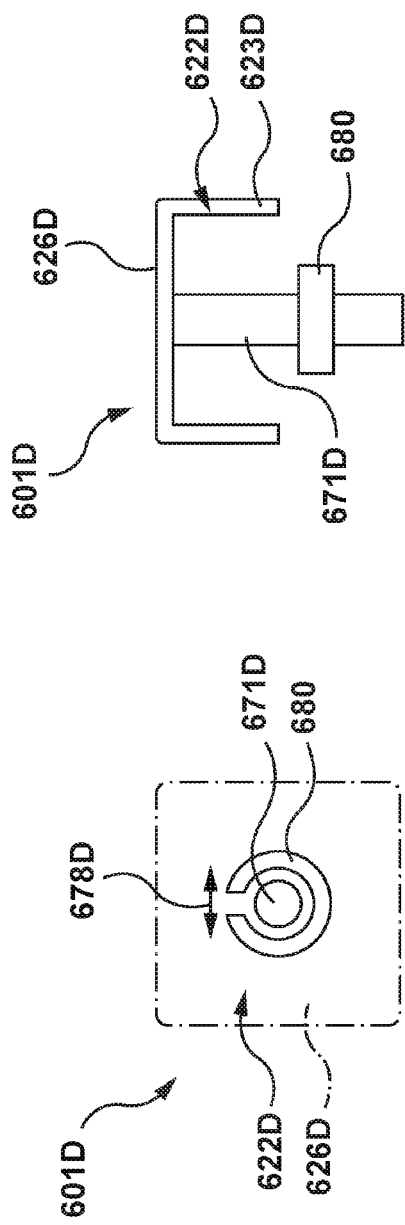

HAPTIC PERIPHERAL HAVING A HAPTICALLY-ENHANCED USER INPUT ELEMENT INCLUDING A MECHANICAL KEY AND AN INTEGRATED SMART MATERIAL ACTUATOR FOR PROVIDING HAPTIC EFFECTS

FIELD OF THE INVENTION

Embodiments hereof relate to haptic effects and more particularly relates to a haptic peripheral having a user input element including a mechanical key and an integrated smart material actuator for providing haptic effects to a user.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input element to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed devices to alert the user to specific events, or provide realistic feedback to user regarding interaction of the medical device with the patient at the distal end of the medical device.

Conventional haptic feedback systems for gaming, virtual reality, and other devices generally include one or more actuators attached to or contained within the housing of the controller/peripheral for generating the haptic feedback. For example, U.S. Pat. No. 7,106,305 to Rosenberg, assigned to Immersion Corporation and herein incorporated by reference in its entirety, discloses a haptic feedback keyboard device for providing haptic feedback to a user for enhancing interactions in a displayed environment provided by a computer. The haptic keyboard device can be a keyboard having multiple keys, or can be a wrist rest or other attachment coupled to a keyboard. An actuator is coupled to a housing of the device that is physically contacted by the user and applies a force to the housing such that the force is transmitted to the user contacting the housing.

Embodiments hereof relate to a haptic feedback system that provides improved haptic feedback or effects to a user input element of a haptic peripheral, such as but not limited to a keyboard, gamepad, controller, or other peripheral.

BRIEF SUMMARY OF THE INVENTION

Embodiments hereof are directed to a haptic peripheral which includes a housing and a haptically-enhanced user input element. The haptically-enhanced user input element is configured to receive an input from a user, and includes a mechanical key having a keycap with a user contact surface configured to contact the user and a smart material actuator integrated onto the user contact surface of the keycap. The smart material actuator is configured to receive a control signal from a processor and is configured to deform at least a portion of the user contact surface relative to the keycap of the mechanical key in response to the control signal from the processor to thereby provide a haptic effect to a user of the haptic peripheral.

According to another embodiment hereof, a haptic peripheral includes a housing and a haptically-enhanced user input element. The haptically-enhanced user input element is configured to receive an input from a user, and includes a mechanical key having a keycap with a user contact surface configured to contact the user and a smart material actuator integrated onto the user contact surface of the keycap. The smart material actuator is configured to receive a control signal from a processor and is configured to deform at least a portion of the user contact surface relative to the keycap of the mechanical key in response to the control signal from the processor to thereby provide a haptic effect to a user of the haptic peripheral. The haptic peripheral also includes a braking actuator coupled to the mechanical key. The braking actuator is configured to hold the mechanical key in a pressed down position to indicate an inactive status to a user.

According to another embodiment hereof, a gaming system includes a host computer, a processor, and a haptic peripheral. The haptic peripheral includes a housing and a haptically-enhanced user input element. The haptically-enhanced user input element is configured to receive an input from a user, and includes a mechanical key having a keycap with a user contact surface configured to contact the user and a smart material actuator integrated onto the user contact surface of the keycap. The smart material actuator is configured to receive a control signal from a processor and is configured to deform at least a portion of the user contact surface relative to the keycap of the mechanical key in response to the control signal from the processor to thereby provide a haptic effect to a user of the haptic peripheral. The processor is located within the housing of the haptic peripheral, or the processor is disposed in the host computer.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 4 is an exploded perspective view of a smart material or piezoelectric actuator.

FIG. 4A is a perspective view of the components of FIG. 4 coupled together.

FIG. 4B is a perspective view of FIG. 4A after producing an electric charge and bending in response thereto.

FIG. 6C is a schematic side view of an exemplary braking actuator for use in FIGS. 6A and 6B.

FIG. 6D is a schematic top view of another exemplary braking actuator for use in FIGS. 6A and 6B.

FIG. 6E is a side view of the braking actuator of FIG. 6D.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other haptic feedback devices.

Embodiments hereof relate to a haptic peripheral of a haptic feedback system, the haptic peripheral including a housing and a haptically-enhanced user input element or key. The haptically-enhanced user input element is configured to receive an input from a user, and includes a mechanical or spring-based key having a user contact surface configured to contact the user and a smart material actuator integrated onto the user contact surface of the mechanical key. The smart material actuator is configured to receive a control signal from a processor and is configured to deform at least a portion of the user contact surface relative to the keycap of the mechanical key in response to the control signal from the processor to thereby provide a haptic effect to a user of the haptic peripheral.

Figure 1:
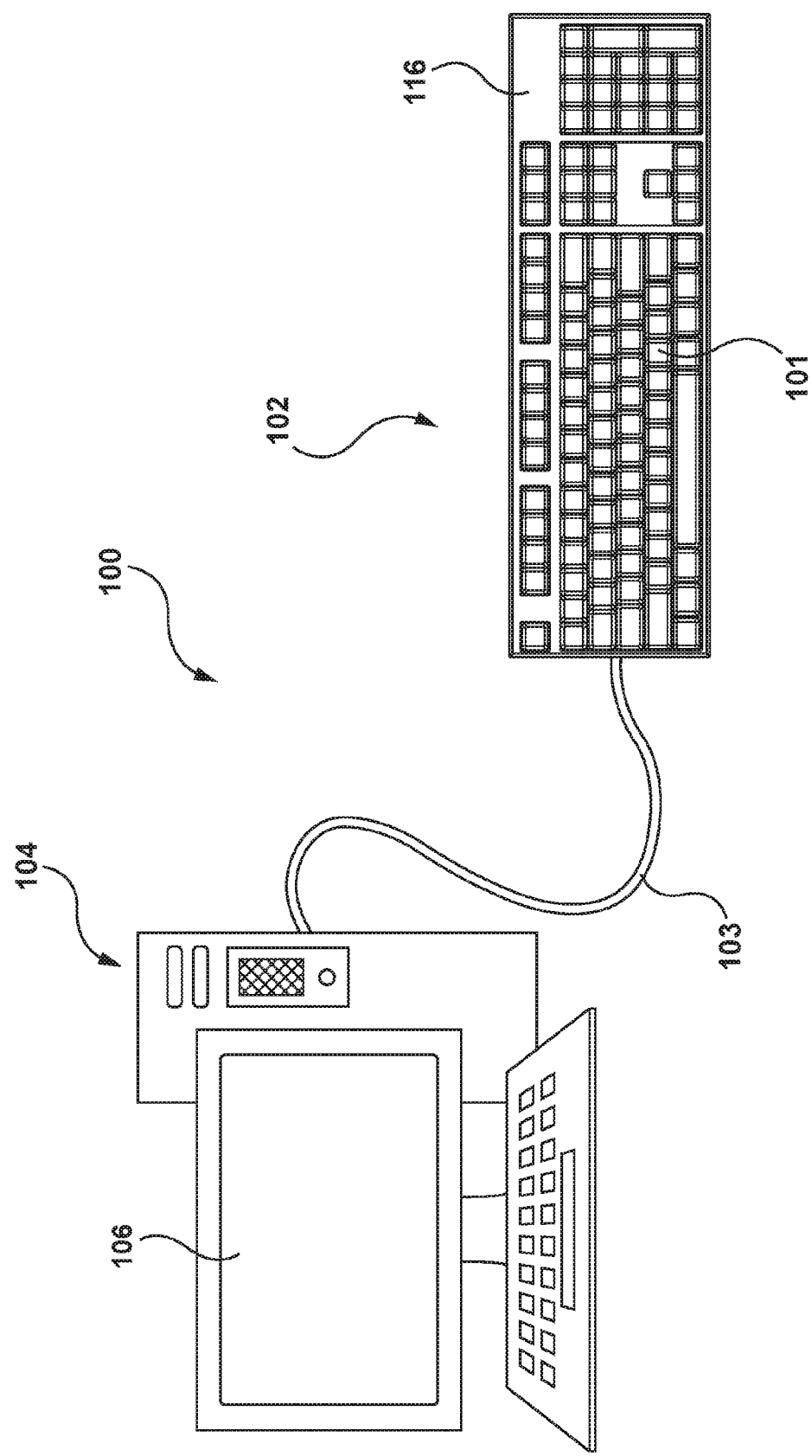
FIG. 1 is a schematic illustration of a system including a haptic peripheral according to an embodiment hereof, wherein the system also includes a host computer and display.
Figure 2:
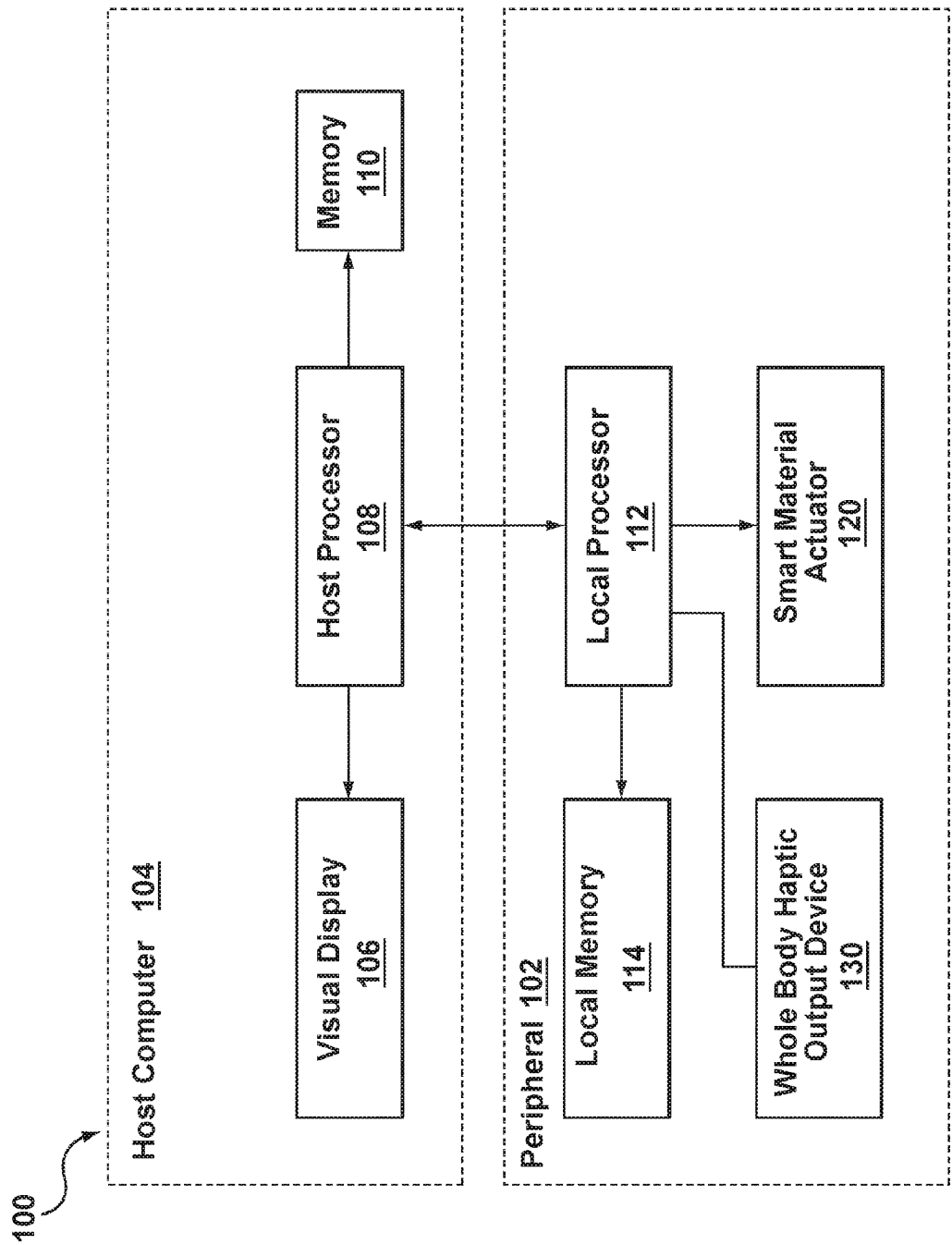
FIG. 2 is a block diagram of the system of FIG. 1.

More particularly, with reference to the figures, FIG. 1 is a schematic illustration of a haptic feedback system 100 including a haptic peripheral 102, a host computer 104, and a display 106. FIG. 2 is a block diagram of the system of FIG. 1. Haptic peripheral 102 is in communication with host computer or computer system 104 that is configured to generate a virtual environment to a user on video or visual display 106. Host computer 104 may include a video game console, mobile device, or any other type of computer system that contains a processor configured to generate a virtual environment to a user on a display. As shown in the block diagram of FIG. 2, host computer 104 includes a host processor 108, a memory 110, and visual display 106. Host computer 104 executes a software application that is stored in memory 110 and is executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to visual display 106 via wired or wireless means. Visual display 106 may be any type of medium that provides graphical information to a user; this includes but is not limited to monitors, television screens, plasmas, LCDs, projectors, head-mounted displays, virtual reality displays, or any other display devices. In an embodiment, host computer 104 is a gaming device console and visual display 106 is a monitor which is coupled to the gaming device console, as known in the art. In another embodiment, as known to those skilled in the art, host computer 104 and visual display 106 may be combined into a single device.

In the embodiment shown in FIGS. 1-2, host computer 104 is in communication with haptic peripheral 102 through a wired or USB connection 103. In an embodiment, wired or USB connection 103 communicates signals between haptic peripheral 102 and host computer 104 and also provides power to haptic peripheral 102. Components of the present invention such as a smart material actuator (described below) require power that in some embodiments can be supplied through wired or USB connection 103. In some embodiments, the power for the actuator can be supplemented or solely supplied by a power storage device provided on haptic peripheral 102 such as a capacitor or one or more batteries. However, in other embodiments, haptic peripheral 102 may communicate with host computer 104 using other wired communication or wireless communication means known to those of skill in the art. This can include but is not limited to a serial or Bluetooth connection. Further, host computer 104 may be in the cloud and thus is not required to be wired or connected wirelessly in a local fashion.

As shown in the block diagram of FIG. 2, haptic peripheral 102 includes a local processor 112 which communicates with host computer 104 via connection 103, a local memory 114, a smart material actuator 120, and a whole body haptic output device 130, although the whole body haptic output device is not required in all embodiments as will be described in more detail herein. In operation, local processor 112 is coupled to smart material actuator 120 and whole body haptic output device 130 to provide control signals thereto based on high level supervisory or streaming commands from host computer 104. For example, when in operation, voltage magnitudes and durations are streamed from host computer 104 to haptic peripheral 102 where information is provided to smart material actuator 120 and whole body haptic output device 130 via local processor 112. Host computer 104 may provide high level commands to local processor 112 such as the type of haptic effect to be output (e.g. vibration, jolt, detent, pop, etc.) by smart material actuator 120 and/or whole body haptic output device 130, whereby the local processor 112 instructs smart material actuator 120 and/or whole body haptic output device 130 as to particular characteristics of the haptic effect which is to be output (e.g. magnitude, frequency, duration, etc.). Local processor 112 may retrieve the type, magnitude, frequency, duration, or other characteristics of the haptic effect from a local memory 114 coupled thereto (shown in the block diagram of FIG. 2). In addition, similar to memory 110 of host computer 104, local memory 114 that can be any type of storage device or computer-readable medium, such as but not limited to random access memory (RAM) or read-only memory (ROM). Local memory 114 may also be located internal to the local processor, or any combination of internal and external memory. Similar to host processor 108, local processor 112 also can decide what haptic effects to send and what order to send the haptic effects. In addition, local processor 112 can decide which haptic output device (i.e., smart material actuator 120 or whole body haptic output device 130) will receive the control signal. In another embodiment hereof, haptic peripheral 102 is configured to not include local processor 112, whereby all input/output signals from haptic peripheral 102 are handled and processed directly by host computer 104.

In the embodiment of FIGS. 1-2, haptic peripheral 102 is a keyboard device that includes a housing 116 and a plurality of keys, at least one of which is a haptically-enhanced user input element 101 which includes a mechanical key 122 and a smart material actuator 120 integrated or embedded thereon as will be described in more detail herein. The user provides input to host computer 104 by pressing the keys of the keyboard as is well known. Stated another way, the keys of the keyboard device include corresponding sensors that are configured to sense the press of any of the keys of the keyboard device and provide signals to local processor 112 and/or host processor 108 indicative of the key presses. Sensors suitable for detecting key presses are well known to those skilled in the art. The keys of haptic peripheral 102, including haptically-enhanced user input element 101, are each configured to input actions or otherwise interact with the video game and update the virtual environment as known in the art. Movements of user input elements, i.e., pressing a key of haptic peripheral 102, represent inputs from the user which allows the user to interact with the software applications running on host computer 104, including but not limited to video games relating to first person shooter, third person character interaction, vehicle related games, or computer simulations. For example, pressing a key of haptic peripheral 102 provide host computer 104 with input corresponding to the movement of a computer generated graphical object, such as a cursor or other image, or some other graphical object displayed by the host computer 104 via visual display 106, or to control a virtual character or gaming avatar, such as a person, vehicle, or some other entity that may be found in a game or computer simulation. Herein, "pressing" a key can mean any action including physically contacting a predefined key or area to provide an input signal to a host computer or other controller, and can include physically moving a key from a rest state or position to a depressed state or position, contacting a predefined area that senses user contact, etc. Alternative terms for the "pressing" of a key or button include push, depress, mash, hit, and punch. The keyboard can be a full-sized keyboard or a smaller version, such as a numeric keypad, portable keyboard, or the like.

Figure 14:
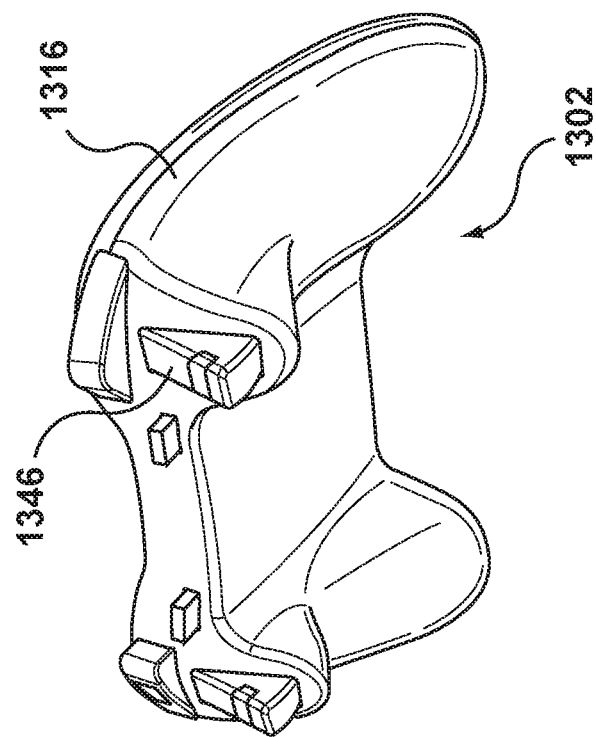
FIG. 14 is another perspective view of the haptic peripheral of FIG. 13.
Figure 13:
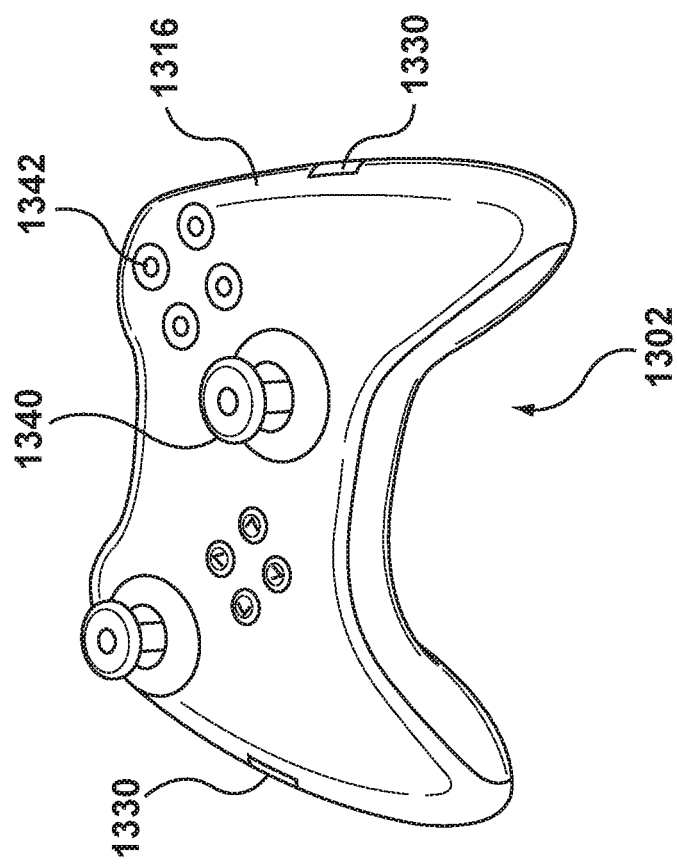
FIG. 13 is a perspective view of a haptic peripheral according to another embodiment hereof, wherein the haptic peripheral is a gaming controller that includes a haptically-enhanced user input element for providing haptic effects to a user, the haptically-enhanced user input element including a mechanical or spring-based key having a user contact surface configured to contact the user and a smart material actuator integrated onto the user contact surface of the mechanical key.
Figure 15:
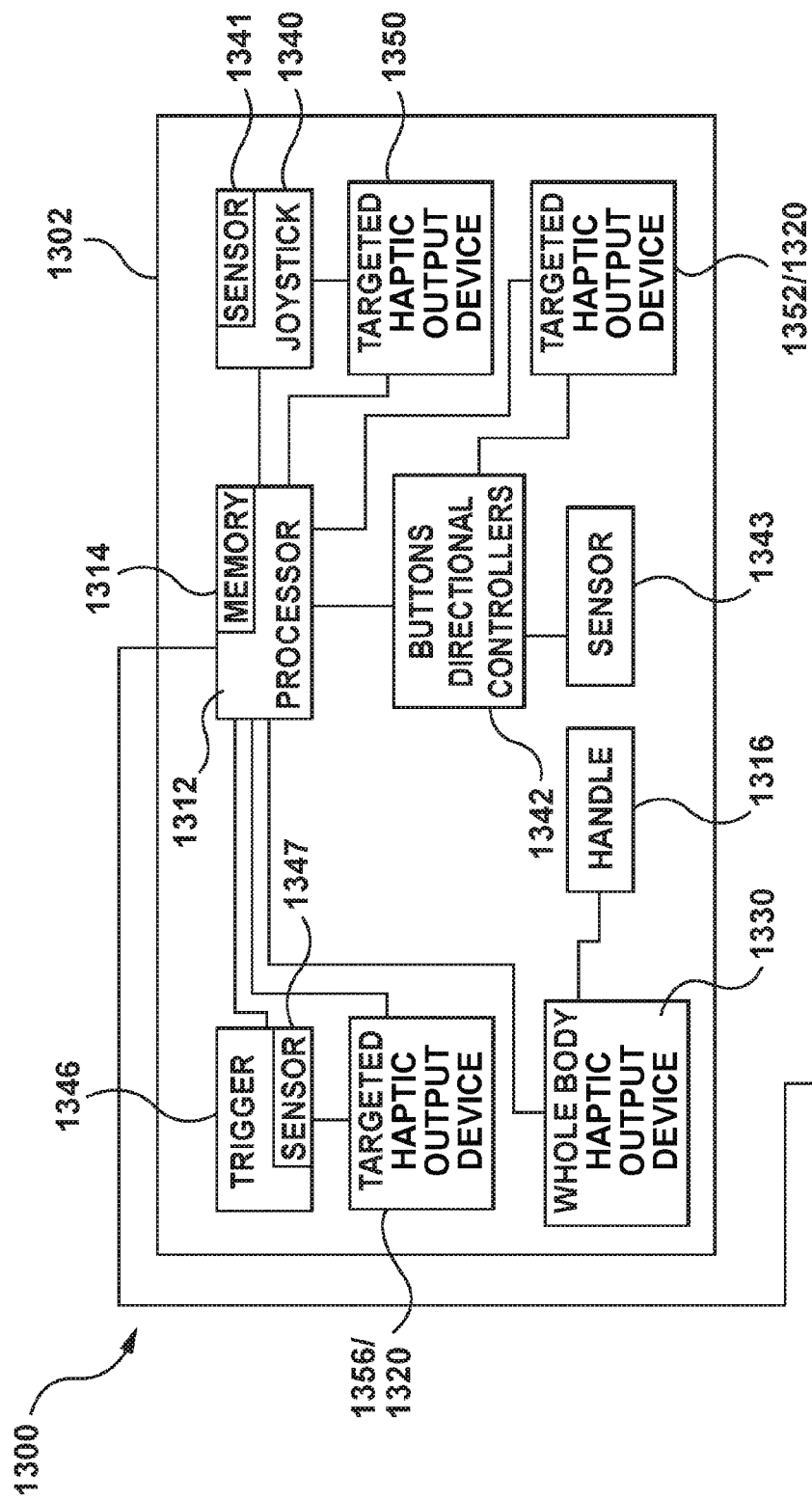
FIG. 15 is a block diagram of the haptic peripheral of FIG. 13 in conjunction with a host computer.
Figure 16:
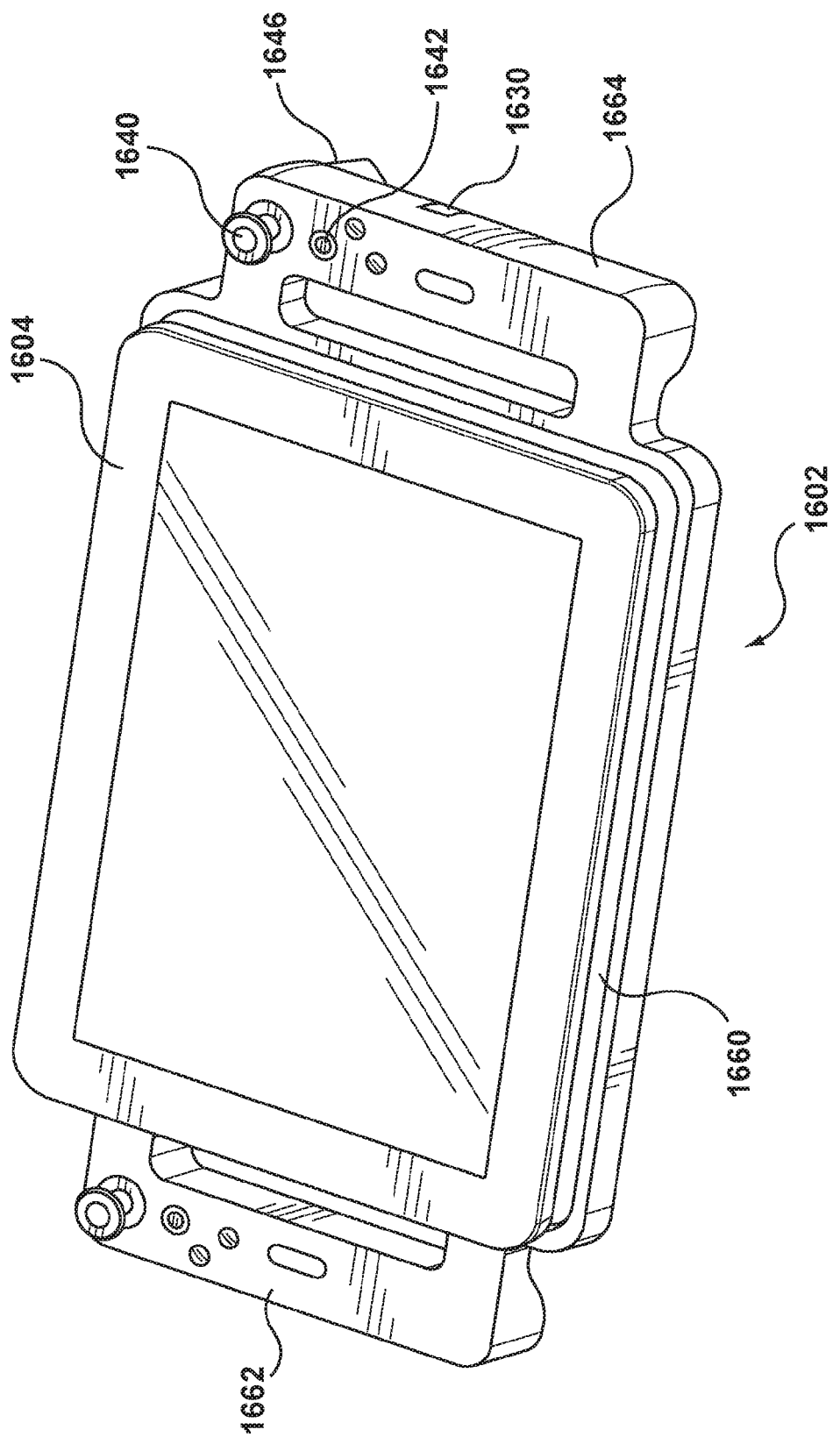
FIG. 16 is a perspective view of a haptic peripheral according to another embodiment hereof, wherein the haptic peripheral is a gaming tablet that includes a haptically-enhanced user input element for providing haptic effects to a user, the haptically-enhanced user input element including a mechanical or spring-based key having a user contact surface configured to contact the user and a smart material actuator integrated onto the user contact surface of the mechanical key.
Figure 17:
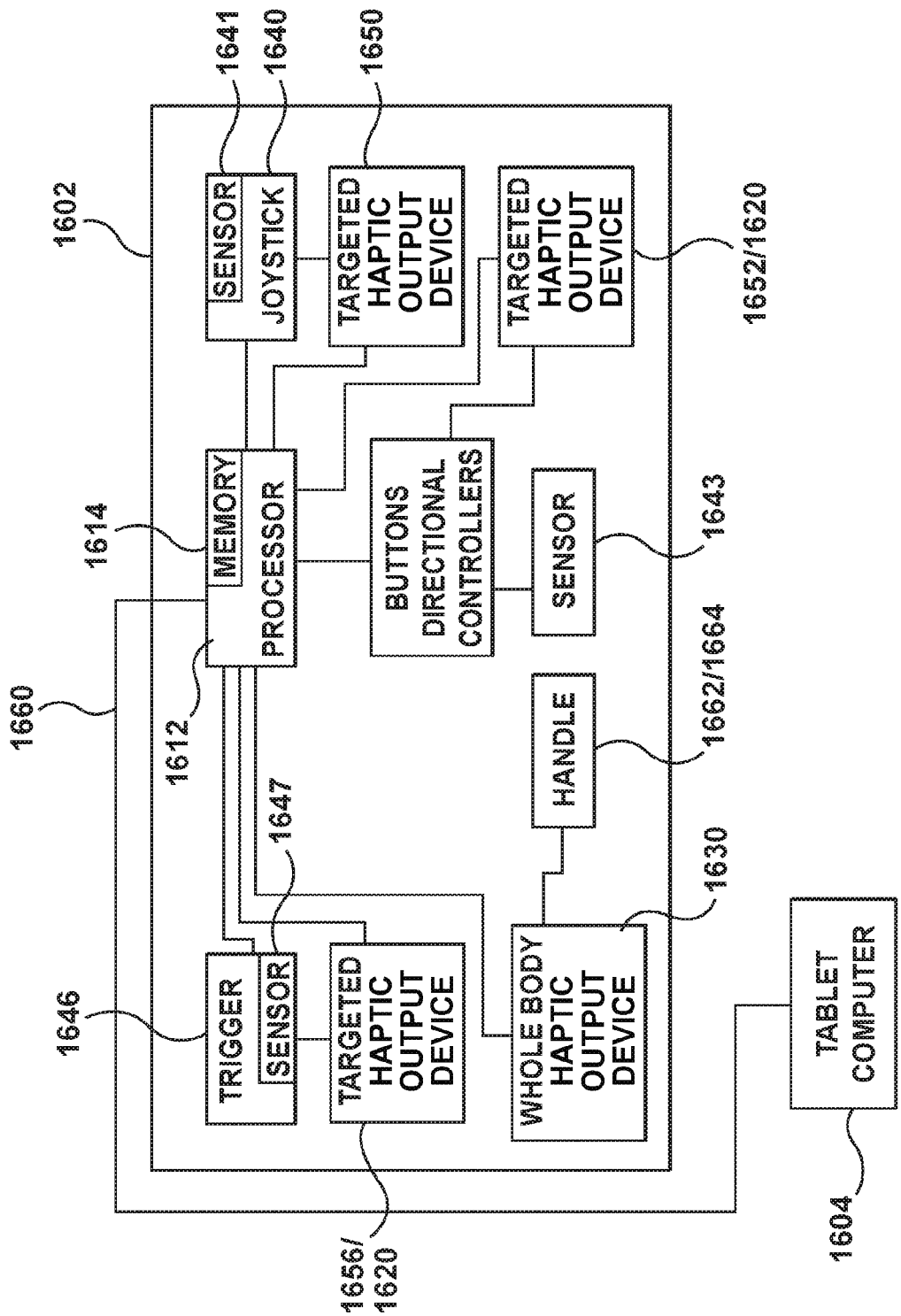
FIG. 17 is a block diagram of the gaming table of FIG. 16.

As previously stated, haptically-enhanced user input element 101 includes mechanical key 122 and smart material actuator 120 integrated or embedded thereon in order to create a wide range of haptic feedback or effects. Stated another way, haptically-enhanced user input element 101 combines a mechanical key with a programmable piezoelectric key in order to improve a user's haptic experience by providing a first type of tactile or haptic feedback via the mechanical key (i.e., tactile or haptic feedback to confirm pressing the mechanical key or button) and a second type of haptic feedback via the smart material or piezoelectric actuator (i.e., programmable haptic feedback relating to game state information). Haptically-enhanced user input element 101 may be implemented on any haptic peripheral having a mechanical key or button. For example, haptically-enhanced user input element 101 as described herein may be implemented as one or more keys of a keyboard, a button or trigger of a gaming controller, and/or a button of a computer mouse. More particularly, although depicted as a keyboard, those skilled in the art would recognize that haptic peripheral 102 is merely an exemplary embodiment of a haptic peripheral and that haptic peripherals with other configurations, shapes, and sizes may be used. For example, as will be described in more detail herein, the haptic peripheral may be a handheld gaming controller 1302 for a gaming system as shown in FIGS. 13-15 which is of similar shape and size to many "gamepads" currently available for video game console systems, a haptic peripheral 1602 that may be used with a tablet computer 1604 as shown in FIGS. 16-17, or other controllers such as, but not limited to, mobile phones, personal digital assistants (PDA), tablets, computers, gaming peripherals, a computer mouse, and other controllers for virtual reality systems known to those skilled in the art.

Figure 3:
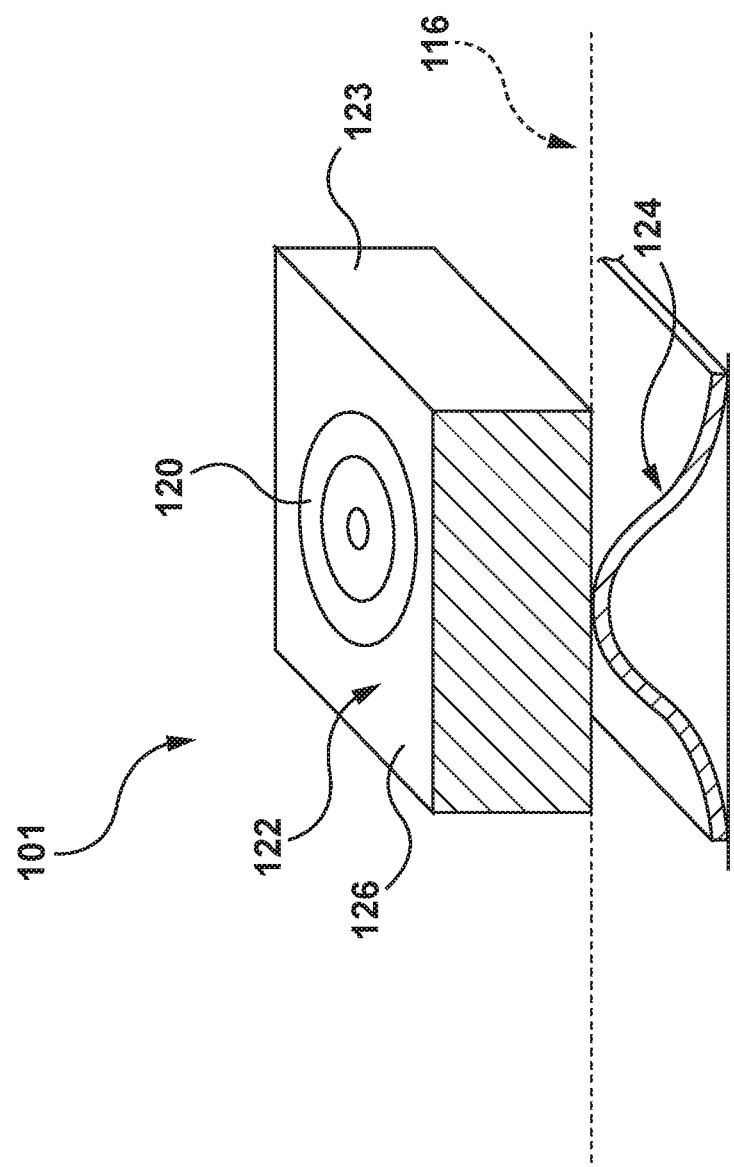
FIG. 3 is a schematic perspective view of a haptically-enhanced user input element for a haptic peripheral according to an embodiment hereof, wherein the haptically-enhanced user input element includes a mechanical or spring-based key having a user contact surface configured to contact the user and a smart material actuator integrated onto the user contact surface of the mechanical key.
Figure 5A:
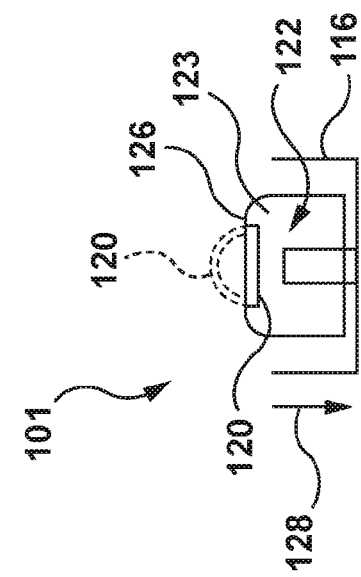
FIG. 5A is a schematic side view of a haptically-enhanced user input element for a haptic peripheral according to another embodiment hereof, wherein the haptically-enhanced user input element includes a mechanical or spring-based key having a user contact surface configured to contact the user and a smart material actuator integrated onto the user contact surface of the mechanical key and the mechanical key is shown in its rest or non-pressed state.
Figure 5B:
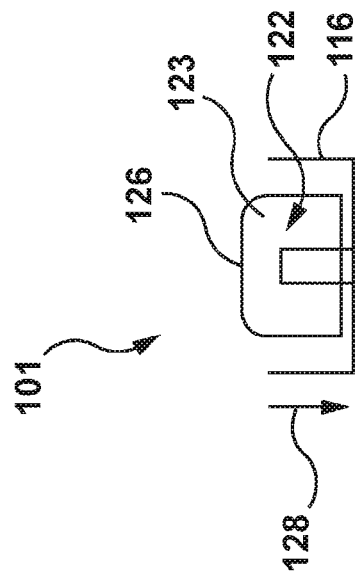
FIG. 5B is a schematic side view of the haptically-enhanced user input element of FIG. 5A, wherein the mechanical key is shown in its depressed or pressed down state.

Haptically-enhanced user input element 101 will be described in more detail with reference to FIG. 3. FIG. 3 is a schematic perspective view of haptically-enhanced user input element 101, and includes mechanical or spring-based key 122 having a keycap 123 with a user contact surface 126 configured to contact the user and smart material or piezoelectric actuator 120 integrated onto user contact surface 126 of mechanical key 122. Smart material actuator 120 is integrated or embedded directly into or onto user contact surface 126 of mechanical key 122. User contact surface 126 of mechanical key 122 is generally flat or shaped to accommodate the human finger or hand, so as to be easily pressed down. As known in the art, mechanical keys are typically formed from a hard material such as plastic or metal and include a spring element to return the key or button to a rest or un-pressed state when no force is applied by the user or by the smart material actuator 120. In this embodiment, the spring element of mechanical key 122 includes a snap dome 124 to resiliently return the key or button to a rest or un-pressed state. Thus, the key or button is in the rest or un-pressed state when no forces are applied thereto and may be considered to be biased in the rest or un-pressed state. Snap dome 124 may be a formed piece of stainless steel that gives the user a crisp, positive tactile feedback when compressed, or alternatively may be formed from a rubber or polyurethane material. However, mechanical key 122 may include a different spring element to return the key or button to a rest or un-pressed state. For example, as shown in the embodiment of FIGS. 5A and 5B, the mechanical key of haptically-enhanced user input element 101 may be a mechanical-switch key which includes a switch composed of a base, a spring, and a stem. Depending on the shape of the stem, mechanical-switch keys have varying actuation and travel distance and depending on the resistance of the spring, mechanical-switch keys require different amounts of pressure to actuate. Mechanical keyboards allow for the removal and replacement of keycaps.

Smart material or piezoelectric actuators 120 will now be described in more detail with respect to FIG. 4, FIGS. 4A, and 4B. FIG. 4 is an exploded perspective view of a portion of a deformable substrate 118 and a smart material actuator 120. FIG. 4A is a perspective view of the components of FIG. 4 coupled together, and FIG. 4B is a perspective view of FIG. 4A after bending in response to an applied electrical charge or electric field. As used herein, "smart material" is a material that moves when an electric field or current is applied. Smart material actuators have the property of exhibiting a change in size or shape when subjected to an electrical charge. Stated another way, smart material actuators exhibit mechanical deformation when an electrical change is exerted on them. Smart materials that may be used herein include a piezoelectric material, a macro fiber composite (MFC) material, an electroactive polymer (EAP), gels, shape memory alloys, Flexinol or another type of material that moves when an electric field or current is applied. Smart material actuator 120 is bonded via adhesive or otherwise coupled to at least one surface of deformable substrate 118. Deformable substrate 118 is made of a flexible material such as a rubber or polymer that can flex or bend in conjunction with smart material actuator 120 to provide its motion and contact forces to the user. When an electrical charge is applied to smart material actuator 120, smart material actuator 120 deforms and bends as shown in FIG. 4B, thereby also bending the portion of deformable substrate 118. The operation of smart material or piezoelectric actuators to output force and deformation based on an input electrical signal is well known to those skilled the art. Piezoelectric material can be made very thin and small, thereby allowing its use in compact housings that are typical for portable electronic devices.

In order to integrate or embed smart material actuator 120 into or onto user contact surface 126 of mechanical key 122, mechanical key 122 may be formed with deformable substrate 118 integrally formed along a portion of user contact surface 126 and smart material actuator 120 may be subsequently bonded to the deformable substrate. Stated another way, at least the top surface of mechanical key 122 (i.e., user contact surface 126) is sufficiently deformable to create a haptic effect and act as deformable substrate 118. Smart material actuator 120 is directly embedded into user contact surface 126 so that the keycap of the mechanical key provides deformable substrate 118. Alternatively, smart material actuator may be deposited onto user contact surface 126 of mechanical key 122 and covered with an insulator layer so that at least an insulator is between the user and smart material actuator 120. The insulator layer may be formed from any type of electrical insulator material including plastic or polymer materials.

In another embodiment hereof, a portion of a keycap of mechanical key 122 may be removed to form an opening on user contact surface 126 of mechanical key 122, and deformable substrate 118 having smart material actuator 120 bonded thereto is positioned within the opening. Deformable substrate 118 having smart material actuator 120 bonded thereto is then coupled to mechanical key 122 in order to be moveable thereto so that deformable substrate 118 can flex or bend in conjunction with smart material actuator 120. For example, deformable substrate 118 having smart material actuator 120 bonded thereto may be coupled to mechanical key 122 via a flexure or moveable coupling (not shown).

In order to apply an electrical charge to smart material actuator 120, haptic feedback system 100 includes control hardware and software that provide electric signals to smart material actuator 120 causing smart material actuator 120 to induce desired motion of deformable substrate to produce haptic feedback or effects to a user. More particularly, haptic feedback system 100 includes a power source for supplying an electrical charge to smart material actuator 120 and haptic feedback system 100 also includes host processor 104 and/or local processor 112 which controls the power source and thus determines the magnitude and frequency of the applied electrical charge. Accordingly, the power source is configured to receive a control signal from host processor 104 and/or local processor 112 and is configured to apply an electrical charge to smart material actuator in accordance with the control signal received from host processor 104 and/or local processor 112. The power source may be located within haptic peripheral 102 or host computer 104. Smart material actuator 120 deforms or bends in response to the applied electrical charge from the power source. With deformable substrate 118 coupled to smart material actuator 120, any forces and/or deformation produced by smart material actuator 120 are directly applied to deformable substrate 118. The portion of deformable substrate 118 coupled to smart material actuator 120 is also bent or deformed in conjunction with smart material actuator 120. Thus, smart material actuator 120 deforms deformable substrate 118 relative to housing 116 in response to the control signal from host processor 104 and/or local processor 112 to thereby provide a haptic effect to a user of haptic peripheral 102. Mechanical key 122 and keycap 123 thereof moves relative to housing 116 when the user provides input to host computer 104, while smart material actuator 120 moves or deforms relative to mechanical key 122 and keycap 123 thereof to provide localized haptic effects to the user.

The haptic effect, i.e., deformation of deformable substrate 118, may be considered a deformation haptic effect. As used herein, "deformation" haptic effects include effects in which the smart material actuator applies force directly to the deformable substrate to bend, deform, or otherwise move the deformable substrate, thereby resulting in deformation haptic effects that are felt by the user. Deformation haptic effects as produced by embodiments hereof are felt by the user because the smart material actuator directly drives, deforms, or otherwise moves the deformable substrate which is in direct contact with user. Deformation haptic effects may be macro deformation in which deformation is on the millimeter scale, or micro deformation in which deformation is on the micrometer scale. Examples of macro deformation haptic effects include a jolt via a single relatively large deformation in conjunction with a virtual button or trigger press (i.e., when a shot is fired by the user) or collisions between virtual elements (i.e., a bullet, wall, or other object impacts the user's character or vehicle). In another gaming example, haptic effects include vibrations via multiple relatively small or micro deformations in conjunction with movement of virtual elements across the screen, or other types of screen movements. Additional examples of deformation haptic effects include a heartbeat haptic effect in which the deformation of smart material actuator 120 and deformable substrate 118 follows the pattern of a heartbeat signal, in both magnitude and frequency, and/or a breathing haptic effect in which deformation of smart material actuator 120 and deformable substrate 118 follows the pattern of a small living animal which is breathing in your hand in a virtual reality environment. Such haptic feedback or effects allows for a more intuitive, engaging, and natural experience for the user of haptic feedback system 100 and thus interaction between the user and haptic feedback system 100 is considerably enhanced through the tactile feedback provided by the haptic effects.

Advantageously, the haptic effects output by smart material actuator 120 are temporal or transient and may be output when mechanical key 122 is in a rest or non-pressed state, when mechanical key 122 is being pressed down, and/or when mechanical key 122 is in a pressed down or depressed state. With reference to FIG. 5A, haptically-enhanced user input element 101 is shown is its rest or non-pressed state, with smart material actuator 120 being shown as bent or deformed to provide haptic effects in phantom, while FIG. 5B illustrates haptically-enhanced user input element 101 in its pressed down or depressed state after a user-applied downward force 128 has been applied thereto, with smart material actuator 120 being shown as bent or deformed to provide haptic effects in phantom. By outputting haptic effects when mechanical key 122 is in its rest or non-pressed position, with no external force being applied thereto, smart material actuator 120 may output or play haptic effects to provide feedback to the user relating to game state information such as a state transition or alerts or alarms relating to sudden events (i.e., a crash, collision, or other unexpected contact). By outputting haptic effects when mechanical key 122 is being pressed down, smart material actuator 120 is configured to programmatically change the feel or stiffness of the button press. Further, by outputting haptic effects when mechanical key 122 is in a pressed down or depressed position, programmable haptic effects can continue via smart material actuator 120 to provide feedback to the user relating to game state information such as a movement rate or a state transition. For example, in a PC gaming example, the "W", "A", "S", and "D" keys are primarily used for movement in various video games and thus these keys are often pressed and held for long periods of time. Outputting programmable haptic effects via smart material actuator 120 when mechanical key 122 is held in a pressed down or depressed position is useful for indicating movement rate, state transitions or other in game information such as health status, weapon recharge rate, and the like. The transient haptic effects can be different haptic waveforms or timed to occur at different locations in the button or key's throw in order to result in a wide variety of key press sensations that can be conveyed to the user. Key strokes may have different force profiles to indicate different functions such as running, walking, or the like. These force profiles are created by playing different transient haptic effects via smart material actuator 120. Different haptic effects may be played or output when a combination of haptically-enhanced user input elements are pressed. For example, a different haptic sensation or effect is output or played if the user is moving forward and therefore pressing only a single key compared to the haptic sensation or effect that is output or played if the user is moving diagonally and therefore pressing two keys. In an embodiment, a walking haptic effect may be output or played in which deformation of smart material actuator 120 and deformable substrate 118 indicates walking speed when the "W" key is continually pressed down. The user holds down the "W" key to move forward and a temporal sequence of haptic effects will be played in order to indicate his rate of movement.

As previously stated, haptic peripheral 102 includes whole body haptic output device 130 in addition to smart material actuators 120 which provide localized haptic effects. Whole body haptic effects include rumble haptic effects and high definition haptic effects that are output to housing 116. Haptic peripheral 102 thus includes whole body haptic output device 130 which creates or outputs a haptic effect on the whole device or housing, while smart material actuator 120 creates or outputs a haptic effect localized to mechanical key 122. More particularly, as shown in the sectional view of FIG. 3, whole body haptic output device 130 is positioned within housing 116 and is configured to provide vibrational haptic effects to the user in addition to the deformation haptic effects provided by smart material actuators 120. Whole body haptic output device 130 serves to provide the entire housing of haptic peripheral 102 with general or rumble haptic effects and high definition haptic effects. Thus, whole body haptic output device 130 may be considered a rumble actuator that is configured to receive a second control signal from host processor 104 and/or local processor 112 and output a second haptic effect to housing 116 in response to the second control signal. Whole body haptic output device 130 receives control signals from host processor 104 and/or local processor 112 based on high level supervisory or streaming commands from host computer 104. For example, when in operation, voltage magnitudes and durations are streamed from host computer 104 to haptic peripheral 102 where information is provided to whole body haptic output device 130 via local processor 112. Host computer 104 may provide high level commands to local processor 112 such as the type of haptic effect to be output (e.g. vibration, jolt, detent, pop, etc.) by whole body haptic output device 130, whereby the local processor 112 instructs whole body haptic output device 130 as to particular characteristics of the haptic effect which is to be output (e.g. magnitude, frequency, duration, etc.). Whole body haptic output device 130 may include electromagnetic motors, eccentric rotating mass ("ERM") actuators in which an eccentric mass is moved by a motor, linear resonant actuators ("LRAs") in which a mass attached to a spring is driven back and forth, vibrotactile actuators, other suitable types of actuating devices. Whole body haptic output device 130 is implemented as an inertial actuator to provide vibrotactile feedback to the user. Thus, smart material actuators 120 provide localized deformation haptic effects or sensations to the user that are independent of and complementary to general or rumble haptic feedback produced by whole body haptic output device 130.

When multiple haptic peripherals are being utilized, spatialization or directional haptic effects may be output or played. For example, a user may be using both a haptic keyboard and a haptic mouse to play a video game. The haptic effect control signals for each haptic peripheral may correspond to directional events happening to the left and right sides of the computer controlled character or object (i.e., a left side of the character is bumped or hit by something in the video game). If the computer controlled character or object is being hit from the right side in the video game, haptic effects may be played on the haptic keyboard where the user has his right hand. If the computer controlled character or object is being hit from the left side in the video game, haptic effects may be played on the haptic mouse where the user has his left hand.

Figure 6A:
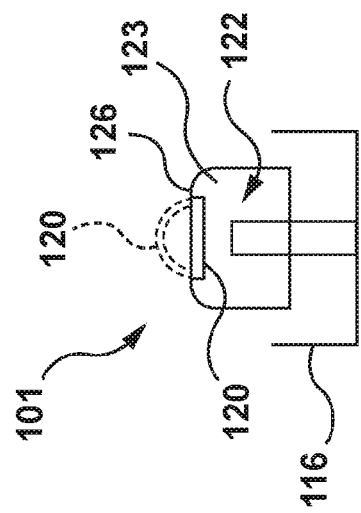
FIG. 6A is a schematic side view of a haptically-enhanced user input element for a haptic peripheral according to another embodiment hereof, wherein the haptically-enhanced user input element includes a mechanical or spring-based key having a user contact surface configured to contact the user, a smart material actuator integrated onto the user contact surface of the mechanical key, and a braking actuator and the mechanical key is shown in its rest or non-pressed state.
Figure 6B:
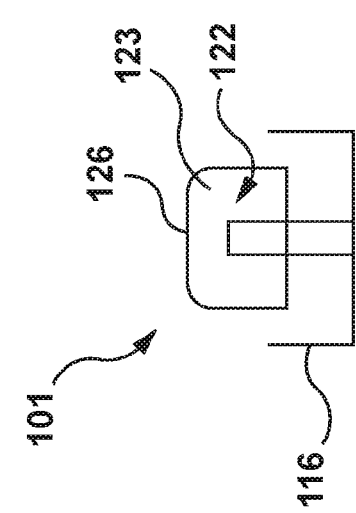
FIG. 6B is a schematic side view of the haptically-enhanced user input element of FIG. 6A, wherein the mechanical key is shown in its depressed or pressed down state via the braking actuator.

In an embodiment hereof shown in FIGS. 6A and 6B, in addition to smart material actuator 120 for providing deformation haptic effects to a user, haptically-enhanced user input element 101 further includes a braking actuator 129 coupled to mechanical key 122. Braking actuator 129 is configured to hold mechanical key 122 in a depressed or pressed down state to indicate an inactive status to a user. Stated another way, braking actuator 129 is configured to hold mechanical key 122 in a depressed or pressed down state without any user force applied thereto. With reference to FIG. 6A, haptically-enhanced user input element 101 is shown is its rest or non-pressed state while FIG. 6B illustrates haptically-enhanced user input element 101 in its pressed down or depressed state after braking actuator 129 applies and maintains a downward force 128 thereto. Braking actuator 129 is useful to deactivate or inactivate a particular haptically-enhanced user input element 101 when a function associated with the particular haptically-enhanced user input element is unavailable. More particularly, most buttons or triggers in a gaming haptic peripheral are associated with particular abilities or functions which include a "cool down" or "recharging" period during which the abilities cannot be activated or used. During the cool down period, haptically-enhanced user input element 101 is held in the depressed state via braking actuator 129 so that a user cannot move mechanical key 122 further down. With haptically-enhanced user input element 101 held in the depressed state via braking actuator 129, a user is visually and haptically informed that the ability cannot be used. When the ability is available again, braking actuator 129 releases haptically-enhanced user input element 101 such that it returns to its rest or non-pressed position of FIG. 6A (which allows mechanical key 122 to be selectively depressed by the user) and thus visually and haptically informs the user that the ability is available again. For example, in a multiplayer online battle arena video game such as DOTA2 or League of Legends, players may map particular keys to their characters special abilities that utilize cooling down or recharging periods. Braking actuator 129 is utilized to visually and haptically indicate the status of a function or ability associated with haptically-enhanced user input element 101.

In an embodiment hereof, haptically-enhanced user input element 101 may be held in the partially depressed state via braking actuator 129. Stated another way, braking actuator 129 is configured to lock haptically-enhanced user input element 101 in a particular position such as but not limited to half way between the non-pressed position of FIG. 6A and the pressed-down or depressed position of FIG. 6B. In another embodiment hereof, braking actuator 129 is configured to only partially brake haptically-enhanced user input element 101 such that the user input element may be pressed but the stiffness thereof is increased.

Braking actuator 129 may be a solenoid, a smart material collar style brake, or other braking actuator known in the art. In an embodiment hereof, braking actuator 129 is magnetic and is also configured to modulate a stiffness of mechanical key 122 during depression thereof by a user. For example, FIG. 6C is a schematic side view of a haptically-enhanced user input element 601C having a solenoid 670C as a braking actuator. Haptically-enhanced user input element 601C includes a mechanical or spring-based key 622C having a keycap 623C with a user contact surface 626C configured to contact the user and a smart material or piezoelectric actuator (not visible on the side view of FIG. 6C) integrated onto user contact surface 626C of mechanical key 622C. Mechanical key 622C includes a post or stem 671C having a first end attached to keycap 623C and a second end attached to a spring 673C. When mechanical key 622C is pressed down or depressed as indicated by directional arrow 628C, spring 673C compresses and stem 671C moves relative to a receptacle 672C of the housing. Solenoid 670C is located external to receptacle 672C. In operation, solenoid 670C moves in a lateral or side-to-side direction as indicated by directional arrow 678C and a shaft 676C of the solenoid passes through a slot or opening 674C formed through a sidewall of receptacle 672C. Shaft 676C presses against stem 671C to stop motion thereof, either fully or partially. More particularly, solenoid 670C may be configured to lock haptically-enhanced user input element 601C in a particular position such as but not limited to half way between the non-pressed position of FIG. 6A and the pressed-down or depressed position of FIG. 6B. In another embodiment hereof, solenoid 670C is configured to only partially brake haptically-enhanced user input element 601C such that the user input element may be pressed but the stiffness thereof is increased.

In another embodiment hereof shown in FIGS. 6D-6E, a haptically-enhanced user input element 601CD has a smart material collar style brake 680 as a braking actuator. Haptically-enhanced user input element 601D includes a mechanical or spring-based key 622D having a keycap 623D with a user contact surface 626D configured to contact the user and a smart material or piezoelectric actuator (not shown for sake of clarity) integrated onto user contact surface 626D of mechanical key 622D. Mechanical key 622D includes a post or stem 671D and smart material collar style brake 680 is circumferentially disposed around stem 671D. In operation, smart material collar style brake 680 compresses around stem 671D such that the ends of the smart material collar style brake 680 move closer together or further apart as indicated by directional arrow 678D. Smart material collar style brake 680 squeezes or compresses around stem 671D to stop motion thereof, either fully or partially. More particularly, smart material collar style brake 680 may be configured to lock haptically-enhanced user input element 601D in a particular position such as but not limited to half way between the non-pressed position of FIG. 6A and the pressed-down or depressed position of FIG. 6B. In another embodiment hereof, smart material collar style brake 680 is configured to only partially brake haptically-enhanced user input element 601D such that the user input element may be pressed but the stiffness thereof is increased.

Notably, smart material actuator 120 may still output or play deformation haptic effects while braking actuator 129 holds mechanical key 122 in a depressed or pressed down position. Thus, in an embodiment hereof, several adjacent haptically-enhanced user input elements 101 may be simultaneously held down in the depressed position via their respective braking actuator to form a continuous input surface for scrolling input or commands, and their respective smart material actuators 120 may output or play haptic effects to haptically confirm the scrolling input or commands.

In embodiments hereof including a braking actuator configured to hold the mechanical key in a depressed or pressed down state to indicate an inactive status to a user, the mechanical key may initially be put into the depressed or pressed down state via the user. Thus, when a user presses the mechanical key down, the braking actuator then holds the mechanical key in the depressed or pressed down position to indicate the inactive status to the user. In another embodiment hereof, the mechanical key may initially be put into the depressed or pressed down state via an additional actuator that programmatically moves the mechanical key into the depressed or pressed down state. In such an embodiment, a user does not need to initially press the mechanical key down but rather the additional actuator forces the mechanical key into a depressed or pressed down state and the braking actuator then holds the mechanical key in the depressed or pressed down position to indicate the inactive status to the user.

Figure 7:
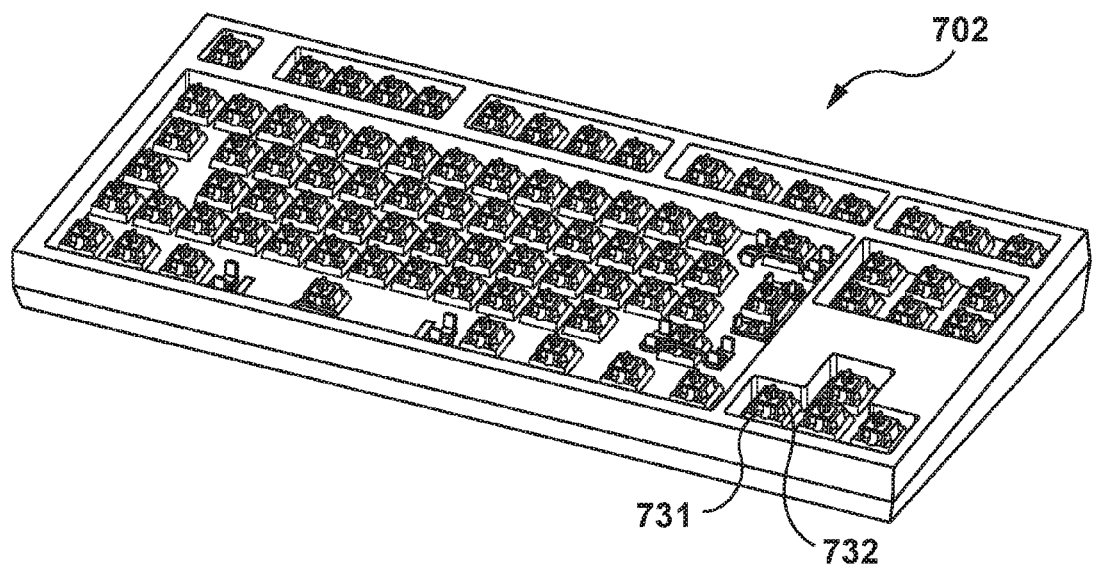
FIG. 7 is a perspective view of a modular keyboard having a plurality of key receptacles.
Figure 7A:
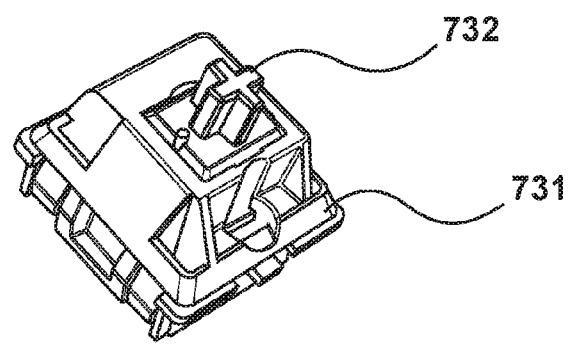
FIG. 7A is an enlarged perspective view of a single key receptacle of the modular keyboard of FIG. 7.
Figure 8A:
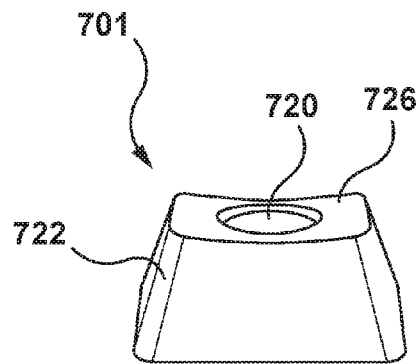
FIG. 8A is a perspective view of a modular haptically-enhanced user input element for the modular keyboard of FIG. 7, wherein the modular haptically-enhanced user input element includes a mechanical or spring-based key having a user contact surface configured to contact the user, a smart material actuator integrated onto the user contact surface of the mechanical key, and is configured to be coupled to the key receptacle of FIG. 7A via a clip or post.
Figure 8B:
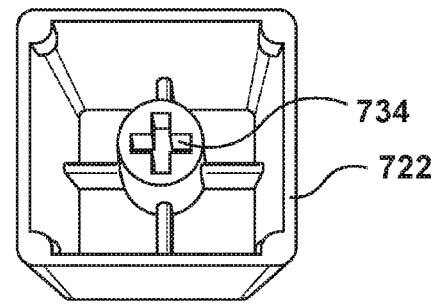
FIG. 8B is another perspective view of the modular haptically-enhanced user input element of FIG. 8A.

In an embodiment, the haptically-enhanced user input element is modular and is configured to selectively replace a standard mechanical key or button of the haptic peripheral by the user. A modular haptically-enhanced user input element is a "special" or "hot" key that is haptically-enabled and may be selectively moved to a specific location on a keyboard so that the specific location of the haptically-enabled key is determined or selected by the user. For example, in a PC gaming example, the "W", "A", "S", and "D" keys are primarily used for movement in various video games and thus these keys are often pressed and held for long periods of time. It may be desirable for a user to replace the standard "W", "A", "S", and "D" keys with one or more modular haptically-enhanced user input element(s) having an integrated smart material actuator as described herein. Rather than forming every mechanical key or button with an integrated smart material actuator, a single keyboard may feature one or more modular haptically-enhanced user input element(s) in order to save on cost and/or power requirements. More particularly, the modular nature of haptically-enhanced user input element 101 is described in more detail with respect to FIGS. 7-9B. FIG. 7 is a perspective view of a modular keyboard 702 having a plurality of key bases 731, with FIG. 7A being an enlarged perspective view of a single key base 731 of modular keyboard 702. FIGS. 8A and 8B are perspective views of a modular haptically-enhanced user input element 701 for modular keyboard 702. Similar to haptically-enhanced user input element 101, modular haptically-enhanced user input element 701 includes a mechanical or spring-based key 722 having a keycap 723 with a user contact surface 726 configured to contact the user and a smart material actuator 720 integrated onto user contact surface 726 of mechanical key 722. Although described above with respect to the "W", "A", "S", and "D" key combination, it will be apparent to one of ordinary skill in the art that any particular combination of keys could be mapped. For example, in other video games, it is desirable to map a combination of keys "Q", "W", "E", and "R."

Figure 9:
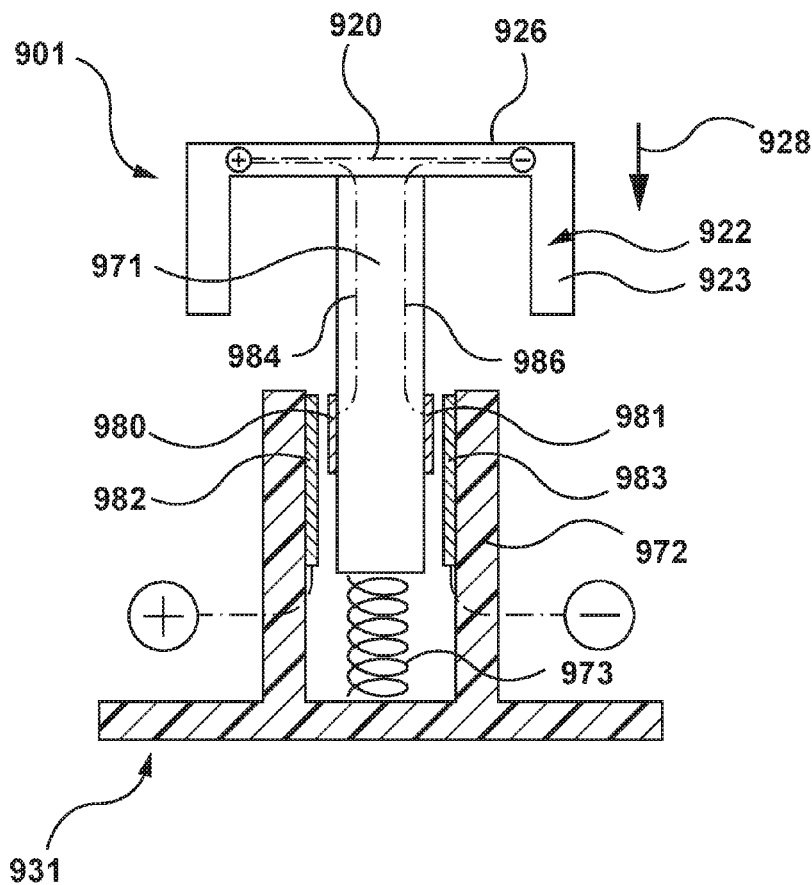
FIG. 9 is a schematic side view of a connection between a key receptacle and a modular haptically-enhanced user input element according to another embodiment hereof.

In this embodiment, haptically-enhanced user input element 701 is configured to be selectively coupled to key base 731 via a clip or post 732. More particularly, as best shown on FIGS. 7A, 8A, and 8B, key base 731 includes clip or post 732 and haptically-enhanced user input element 701 has a matching or mating key receptacle 734. Key receptacle 734 is configured to receive clip or post 732 to couple mechanical key 722 and key base 731 together. Alternatively, in another embodiment, the mechanical key may include the clip or post while the key base includes a matching or mating key receptacle. For example, as shown in FIG. 9 which is a schematic side view of a connection between a key receptacle or base 931 and a modular haptically-enhanced user input element 901, haptically-enhanced user input element 901 includes a mechanical key 922 having a post or stem 971 and key base 931 includes a matching or mating key receptacle 972. When coupled together, mechanical key 922 and key base 931 have a minimum of two connections to drive smart material actuator 920 of modular haptically-enhanced user input element 901. Post or stem 971 has a first end attached to a keycap 923 of mechanical key 922 and a second end attached to a spring 973. When mechanical key 922 is pressed down or depressed as indicated by directional arrow 928, spring 973 compresses and stem 971 moves relative to a receptacle 972 of key base 931. A first wire 984 extends through stem 971 to electrically connect smart material actuator 920 to a first electrode 980 coupled to stem 971, and a second wire 986 extends through stem 971 to electrically connect smart material actuator 920 to a second electrode 981 coupled to stem 971. When stem 971 is inserted into receptacle 972 of key base 931, first and second electrodes 980, 981 attached to stem 971 are configured to contact and electrically connect to first and second electrodes 982, 983 which are coupled to an interior surface of receptacle 972 of key base 931. First and second electrodes 980, 981 of mechanical key 972 interface and physically touch or contact first and second electrodes 982, 983 of key base 931 to supply the necessary power and processor commands to smart material actuator 920 of modular haptically-enhanced user input element 901. In addition to wires 984, 986, modular haptically-enhanced user input element 901 may include additional data lines or wires (not shown) to provide communication between mechanical key 922 and key base 931 for lights, identification, or the like.

Figure 10:
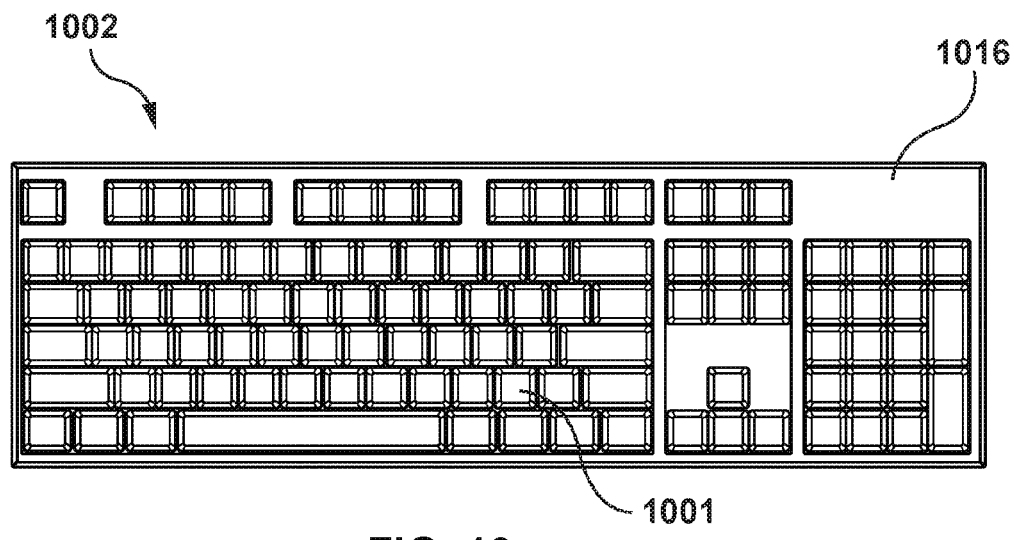
FIG. 10 is a top view of a modular keyboard having a plurality of modular keys or user input elements, wherein at least one modular key is a modular haptically-enhanced user input element.
Figure 11:
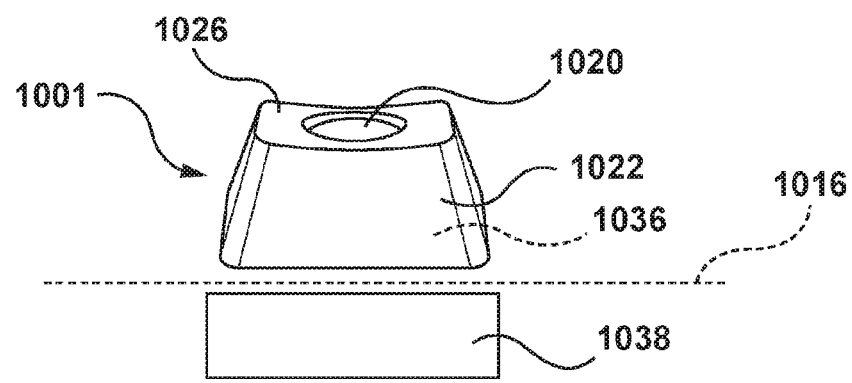
FIG. 11 is a perspective schematic view of a single modular haptically-enhanced user input element of FIG. 10, wherein the modular haptically-enhanced user input element includes a mechanical or spring-based key having a user contact surface configured to contact the user, a smart material actuator integrated onto the user contact surface of the mechanical key, and is configured to be coupled to the modular keyboard of FIG. 10 via a magnet.
Figure 12:
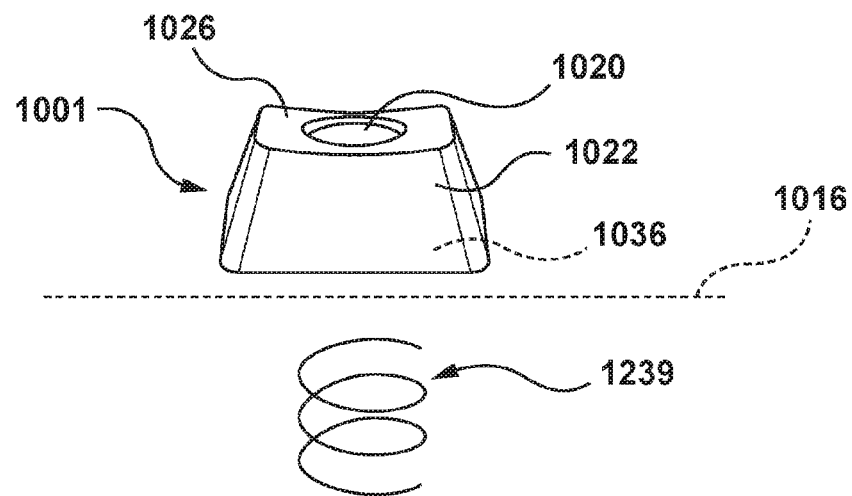
FIG. 12 is a perspective schematic view of a single modular haptically-enhanced user input element of FIG. 10, wherein the modular haptically-enhanced user input element includes a mechanical or spring-based key having a user contact surface configured to contact the user, a smart material actuator integrated onto the user contact surface of the mechanical key, and is configured to be coupled to the modular keyboard of FIG. 10 via an electromagnet.

In another embodiment, a modular haptically-enhanced user input element may be coupled to a modular keyboard via a magnetic connection. FIG. 10 is a top view of a modular keyboard 1002 having one or more modular haptically-enhanced user input element(s) 1001 and a housing 1016, and FIG. 11 is a perspective schematic view of a single modular haptically-enhanced user input element 1001. Similar to haptically-enhanced user input element 101, modular haptically-enhanced user input element 1001 includes a mechanical or spring-based key 1022 having a user contact surface 1026 configured to contact the user and a smart material actuator 1020 integrated onto user contact surface 1026 of mechanical key 1022. In this embodiment, haptically-enhanced user input element 1001 is configured to be selectively coupled to modular keyboard 1002 via a magnets 1036, 1038 disposed in mechanical key 1022 and modular keyboard 1002, respectively. More particularly, housing 1016 of modular keyboard 1002 includes magnet 1038 and haptically-enhanced user input element 1001 has a magnet 1036. Magnetics 1036, 1038 magnetically couple together to couple mechanical key 1022 and modular keyboard 1002 together. When coupled together, modular haptically-enhanced user input element 1001 and modular keyboard 1002 have a minimum of two connections to drive smart material actuator 1020 of modular haptically-enhanced user input element 1001. The haptic modular key could have additional intelligence requiring some data lines to provide communication between modular haptically-enhanced user input element 1001 and modular keyboard 1002 for lights, identification, or the like. In yet another embodiment, shown in FIG. 12, an electromagnet 1239 is disposed in modular keyboard 1002 for magnetically coupling to magnet 1036 of haptically-enhanced user input element 1001. Since the magnetic field of electromagnet 1239 may be selectively turned on and off, electromagnet 1239 may also be utilized to create haptic effects that are felt by the user.

As previously stated, haptic peripheral 102 is merely an exemplary embodiment of a haptic peripheral and that haptic peripherals with other configurations, shapes, and sizes may be used. For example, FIGS. 13-15 illustrate another embodiment of a haptic peripheral 1302 that may be utilized in embodiments hereof. FIGS. 13 and 14 are different perspective views of haptic peripheral 1302, wherein the haptic peripheral is a handheld gaming controller, while FIG. 15 illustrates a block diagram of haptic peripheral 1302 used in a gaming system 1300 that further includes host computer 104. A housing 1316 of haptic peripheral 1302 is shaped to easily accommodate two hands gripping the device, either by a left-handed user or a right-handed user, and whole body haptic output devices 1330 are incorporated into housing 1316 in a location where a hand or palm of the user is generally located to provide general or rumble haptic effects to the user. Those skilled in the art would recognize that haptic peripheral 1302 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, an Xbox™ controller or similar controller, an Oculus Touch™ or Vive HTC™ controller, as well as controllers shaped as real life objects (such as tennis rackets, golf clubs, baseball bats, and the like) and other shapes.

Haptic peripheral 1302 includes several user input elements or manipulandums, including a joystick 1340, a button 1342, and a trigger 1346. As can be seen in FIGS. 13-15 and known to those skilled in the art, more than one of each user input element and additional user input elements may be included on haptic peripheral 1302. Accordingly, the present description of a trigger 1346, for example, does not limit haptic peripheral 1302 to a single trigger. Further, the block diagram of FIG. 15 shows only one (1) of each of joystick 1340, button 1342, and trigger 1346. However, those skilled in the art would understand that multiple joysticks, buttons, and triggers, as well as other user input elements, may be used, as described above.

As can be seen in the block diagram of FIG. 15, haptic peripheral 1302 includes a targeted actuator or motor to directly drive each of the user input elements thereof as well as one or more general or rumble haptic output devices 1330 coupled to housing 1316. More particularly, joystick 1340 includes a targeted actuator or haptic output device 1350 coupled thereto, button 1342 includes a targeted actuator or haptic output device 1352 coupled thereto, and trigger 1346 includes a targeted actuator or haptic output device 1356 coupled thereto. One or more of targeted actuators or haptic output devices 1352 and/or 1356 may be a smart material actuator 1320 integrated onto the button or trigger as described above with respect to haptically-enhanced user input element 101. Stated another way, each of button 1342 and/or trigger 1346 may be a haptically-enhanced user input element 1320 having a mechanical key combined with a smart material actuator as described above in order to provide deformation haptic effects to the user. In addition to a plurality of targeted actuators, haptic peripheral 1302 includes a position sensor coupled to each of the user input elements thereof. More particularly, joystick 1340 includes a position sensor 1341 coupled thereto, button 1342 includes a position sensor 1343 coupled thereto, and trigger 1346 includes a position sensor 1347 coupled thereto. Local processor 1312 is coupled to targeted haptic output devices 1350, 1352, 1356 as well as position sensors 1341, 1343, 1347 of joystick 1340, button 1342, and trigger 1346, respectively. As will be understood by one of ordinary skill in the art, in response to signals received from position sensors 1341, 1343, 1347, local processor 1312 instructs targeted haptic output devices 1350, 1352, 1356 (each of which may be haptically-enhanced user input element 1320) to provide directed or targeted effects directly to joystick 1340, button 1342, and trigger 1346, respectively. Such targeted effects are discernible or distinguishable from general or rumble haptic effects produced by who body haptic output device 1330 along the entire body of haptic peripheral 1302. Local processor 1312 may retrieve the type, magnitude, frequency, duration, or other characteristics of the haptic effect from a memory 1314 coupled to local processor 1312. The collective haptic effects provide the user with a greater sense of immersion to the game as multiple modalities are being simultaneously engaged, e.g., video, audio, and haptics.

FIGS. 16-17 illustrate another embodiment hereof in which the haptic peripheral is a gaming tablet controller 1602 that may be used with a tablet computer 1604. Tablet computer 1604 may be designed specifically for gaming activities, such as is available from Razer Inc., or may be a tablet computer well known and available in the market, such as an Apple® Ipad®, Kindle® Fire®, and Samsung® Galaxy Tab®. Gaming tablet controller 1602 includes a docking portion 1660 configured to receive tablet computer 1604 and handles 1662, 1664 with user input elements disposed thereon for a user to control a game on tablet computer 1604. Docking portion 1660 connects gaming tablet controller 1602 to tablet computer 1604 such that actions by the user on handles 1662, 1664 such as pressing buttons, moving joysticks, pressing triggers, etc., result in actions on the game being played on tablet computer 1604. Handles 1662, 1664 of haptic peripheral 1602 are shaped to easily accommodate two hands gripping the device, either by a left-handed user or a right-handed user, and whole body haptic output devices 1630 are incorporated onto handles 1662, 1664 in a location where a hand or palm of the user is generally located to provide general or rumble haptic effects to the user.

Handles 1662, 1664 include typical user input elements found on controllers. The user input elements will be described with respect to handle 1664. However, those skilled in the art would recognize that the same or similar user input elements may be used on handle 1662. In particular, handle 1664 includes a joystick 1640, a button 1642, and a trigger 1646. As can be seen in FIG. 16 and known to those skilled in the art, more than one of each of these user input elements may be included on each handle 1662, 1664. Further, handle 1664 includes a general or rumble haptic output device 1630 attached thereto for providing general or rumble haptic effects to gaming tablet controller 1602 as described above with respect to general or rumble haptic output device 1630.

FIG. 17 illustrates a block diagram of the gaming tablet controller of FIG. 16 in accordance with an embodiment. As shown in FIG. 17, gaming tablet controller 1602 includes a local processor 1612 which communicates with tablet computer 1604 via docking portion 1660. Other connections, such as wired or wireless connections, may be used instead of docking portion 1660. Tablet computer 1604 in this embodiment includes a display screen. Gaming tablet controller 1602 may be alternatively configured to not include local processor 1612, whereby all input/output signals from gaming tablet controller 1602 are handled and processed directly by tablet computer 1604.

Local processor 1612 is coupled to joystick 1640, button 1642, and trigger 1646, and to position sensors 1641, 1643, and 1647 that may be coupled to joystick 1640, buttons 1642, and trigger 1646, respectively. The block diagram of FIG. 17 shows only one (1) of each of joystick 1640, button 1642, and trigger 1646. However, those skilled in the art would understand that multiple joysticks, buttons, and triggers, as well as other user input elements, may be used, as described above. Targeted actuators or haptic output devices 1650, 1652, 1656 are coupled to joystick 1640, button 1642, and trigger 1646, respectively. One or more of targeted actuators or haptic output devices 1652 and/or 1656 may be a smart material actuator 1620 integrated onto the button or trigger as described above with respect to haptically-enhanced user input element 101. Stated another way, each of button 1642 and/or trigger 1646 may be a haptically-enhanced user input element 1620 having a mechanical key combined with a smart material actuator as described above in order to provide deformation haptic effects to the user. Targeted haptic output devices 1650, 1652, 1656 and whole body haptic output device 1630 are also coupled to local processor 1612, which provides control signals to the haptic output devices 1650, 1652, 1656, 1630 based on high level supervisory or streaming commands from tablet computer 1604. In the streaming embodiment, the voltage magnitudes and durations are streamed to gaming tablet controller 1602 where information is provided by the tablet computer 1604 to the actuators. In operation, tablet computer 1604 may provide high level commands to the local processor 1612 such as the type of haptic effect to be output (e.g. vibration, jolt, detent, pop, etc.) by one or more selected actuators, whereby local processor 1612 instructs the actuator as to particular characteristics of the haptic effect which is to be output (e.g. magnitude, frequency, duration, etc.). Local processor 1612 may retrieve the type, magnitude, frequency, duration, or other characteristics of the haptic effect from a memory 1614 coupled to local processor 1612. The haptic effects provide the user with a greater sense of immersion to the game as multiple modalities are being simultaneously engaged, e.g., video, audio, and haptics.

In an embodiment hereof, any haptically-enhanced user input element described herein may be a pressure-sensitive key. More particularly, the deformation haptic effects output by any haptically-enhanced user input element described herein may vary or be modified according to input from a sensor such as position sensors 1341, 1343, 1347, 1641, 1643, 1647 described above that are coupled to an individual user input element. In an embodiment, the sensor is a strain gauge or other position sensor that can measure how hard a user is pressing the individual user input element down and create a haptic effect accordingly. The deformation haptic effects may vary or be modified according to input from the sensor that is coupled to the individual user input element, with the input being indicative of the pressure applied to the user input element. A position or pressure sensor may be configured to measure the input force or pressure exerted onto a user input element, and the local processor and/or host processor may vary the deformation haptic effects according to the sensor input. For example, the deformation haptic effect may be stronger or relatively increased if the sensor input indicates or detects that a user is pressing harder on the user input element. In another example, a user may apply force or pressure to a user input element and receive a deformation haptic effect as the force or pressure crosses various thresholds.

As stated above, the haptic effects output by smart material actuator 120 are temporal or transient and may be output when mechanical key 122 is in a rest or non-pressed state, when mechanical key 122 is being pressed down, and/or when mechanical key 122 is in a pressed down or depressed state. More particularly, in order to output haptic effects when mechanical key 122 is being pressed down, position sensors 1341, 1343, 1347, 1641, 1643, 1647 described above may be used to measure the relative position of the respective user input element in order to play haptic effects while the user input element is being depressed or pressed down. The deformation haptic effects may vary or be modified according to input from the sensor that is coupled to the individual user input element, with the input being indicative of the user input element's relative position. A position sensor may be configured to measure a user input element's relative position or amount of displacement as it is being pressed down, and the local processor and/or host processor may vary the deformation haptic effects according to the sensor input. For example, the deformation haptic effects may be used to provide user input elements with different force profiles be combining the smart material haptic effect with the mechanical snap dome effect at different points in the keys displacement while it is being pressed down.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic peripheral comprising:
a housing; and
a haptically-enhanced user input element configured to receive an input, the haptically-enhanced user input element including a mechanical key having a keycap with a user contact surface and a smart material actuator integrated onto the user contact surface of the keycap, wherein the smart material actuator is configured to receive a control signal from a processor and is configured to deform at least a portion of the user contact surface relative to the keycap of the mechanical key in response to the control signal from the processor to thereby provide a haptic effect to a user of the haptic peripheral.

2. The haptic peripheral of claim 1, wherein the smart material actuator is a piezoelectric material.

3. The haptic peripheral of claim 1, wherein the haptically-enhanced user input element is one of a plurality of keys of a keyboard.

4. The haptic peripheral of claim 1, wherein the haptically-enhanced user input element is modular and configured to selectively replace one of a plurality of keys of a keyboard.

5. The haptic peripheral of claim 4, wherein the haptically-enhanced user input element is configured to clip onto a post to couple to the keyboard to replace the one of the plurality of keys of the keyboard.

6. The haptic peripheral of claim 4, wherein the haptically-enhanced user input element is configured to magnetically couple to the keyboard to replace the one of the plurality of keys of the keyboard.

7. The haptic peripheral of claim 1, wherein the haptic peripheral is a gaming controller and the haptically-enhanced user input element is a button or a trigger of the gaming controller.

8. The haptic peripheral of claim 1, wherein the haptic effect is transient and is output when the mechanical key is in a pressed down position.

9. The haptic peripheral of claim 8, wherein the haptic effect provides feedback indicating a movement rate or a state transition.

10. The haptic peripheral of claim 1, further comprising a braking actuator coupled to the mechanical key, wherein the braking actuator is configured to hold the mechanical key in a pressed down position to indicate an inactive status.

11. The haptic peripheral of claim 10, wherein the braking actuator is magnetic.

12. The haptic peripheral of claim 11, wherein the braking actuator is also configured to modulate a stiffness of the mechanical key during depression thereof by the user.

13. A haptic peripheral comprising:
a housing;
a haptically-enhanced user input element configured to receive an input, the haptically-enhanced user input element including a mechanical key having a keycap with a user contact surface;
a smart material actuator integrated onto the user contact surface of the mechanical key, wherein the smart material actuator is configured to receive a control signal from a processor and is configured to deform at least a portion of the user contact surface relative to the keycap of the mechanical key in response to the control signal from the processor to thereby provide a haptic effect to a user of the haptic peripheral; and
a braking actuator coupled to the mechanical key, wherein the braking actuator is configured to hold the mechanical key in a pressed down position to indicate an inactive status.

14. The haptic peripheral of claim 13, wherein the smart material actuator is a piezoelectric material.

15. The haptic peripheral of claim 13, wherein the haptically-enhanced user input element is modular and is configured to selectively replace one of a plurality of keys of a keyboard.

16. The haptic peripheral of claim 13, wherein the haptic peripheral is a gaming controller and the haptically-enhanced user input element is a button or a trigger of the gaming controller.

17. The haptic peripheral of claim 13, wherein the braking actuator is magnetic and is also configured to modulate a stiffness of the mechanical key during depression thereof.

18. A gaming system comprising:
a host computer;
a processor; and
a haptic peripheral including a housing and a haptically-enhanced user input element configured to receive an input, the haptically-enhanced user input element including a mechanical key having a keycap and a user contact surface and a smart material actuator integrated onto the user contact surface of the keycap,
wherein the smart material actuator is configured to receive a control signal from the processor and is configured to deform at least a portion of the user contact surface relative to the keycap of the mechanical key in response to the control signal from the processor to thereby provide a haptic effect to a user of the haptic peripheral.

19. The gaming system of claim 18, wherein the processor is located within the housing of the haptic peripheral.

20. The gaming system of claim 18, wherein the processor is disposed in the host computer.

* * * * *